United States Patent [19]

Roschger

[11] Patent Number: 5,466,805
[45] Date of Patent: Nov. 14, 1995

[54] PERINONE DYESTUFFS FOR BULK DYEING OF PLASTICS

[75] Inventor: Peter Roschger, Koeln, Germany

[73] Assignee: Bayer Aktiengesellschaft, Leverkusen, Germany

[21] Appl. No.: 348,510

[22] Filed: Dec. 1, 1994

Related U.S. Application Data

[63] Continuation of Ser. No. 62,636, May 14, 1993, abandoned.

[30] Foreign Application Priority Data

May 21, 1992 [DE] Germany .......................... 42 16 761.2

[51] Int. Cl.$^6$ .......................... C07D 239/70; C09B 57/12
[52] U.S. Cl. .......................... 544/245; 8/657; 8/658; 8/920; 8/922; 8/924; 8/925; 8/928; 524/90
[58] Field of Search .............................................. 544/245

[56] References Cited

FOREIGN PATENT DOCUMENTS

| 1075110 | 10/1954 | France . |
| 1166701 | 11/1958 | France . |
| 730692 | 5/1955 | United Kingdom . |
| 877910 | 9/1961 | United Kingdom . |
| 1037377 | 9/1964 | United Kingdom . |

OTHER PUBLICATIONS

Konishi et al, *Chemical Abstracts* vol. 81, No. 38950 (1974) (Abstract for JP7409530, Jan. 28, 1974).
Konishi et al, *Chemical Abstracts*, vol. 81, No. 38951 (1974) (Abstract for JP 7409532, Jan. 28, 1974).
Hackh's Chemical Dictionary, p. 62, 1969.
Derwent Abstract for JP 49009530 (Jan. 28, 1974).
Derwent Abstract for JP49009552 (Jan. 28, 1974).

*Primary Examiner*—Emily Bernhardt
*Attorney, Agent, or Firm*—Sprung Horn Kramer & Woods

[57] ABSTRACT

1,2-Naphthaloperinone dyestuffs of the formula (I)

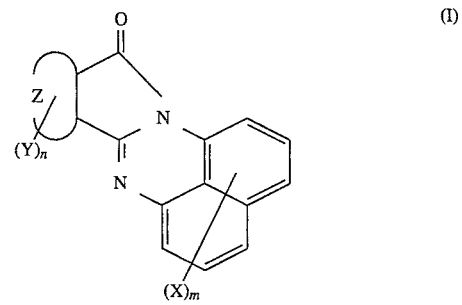

wherein Z denotes the radical for completion of a 1,2-naphthylene system and X, Y, n and m have the meaning given in the description, are prepared by condensation of substituted or unsubstituted naphthalene-1,2-dicarboxylic acids with substituted or unsubstituted naphthalene-1,8-diamines.

The dyestuffs according to the invention have very good fastness properties and are employed in processes for bulk dyeing of plastics, preferably of vinyl polymers and polyesters.

3 Claims, No Drawings

PERINONE DYESTUFFS FOR BULK DYEING OF PLASTICS

This application is a continuation of application Ser. No. 08/062,636, filed May 14, 1993, now abandoned.

The invention relates to perinone dyestuffs, a process for their preparation and their use for bulk dyeing of plastics.

Perinone dyestuffs such as are described, for example, as 2,3-naphthaloperinones in JP-A-4 909 530 and JP-A-4 909 552 or as 1,8-naphthaloperinones in FR-A-1,166,701 and FR-A-1,075,110 (≈GB-A-730 692) are known for dyeing plastics, but have certain disadvantages in respect of their fastness properties.

1,2-Naphthaloperinone dyestuffs of the general formula (I)

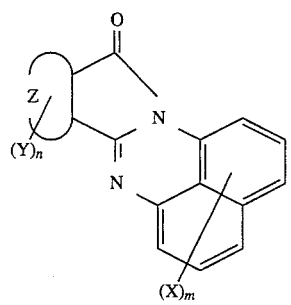

wherein

Z is a radical for completion of a 1,2-naphthylene system,

X is $C_1$–$C_5$-alkyl, halogen, nitro, chlorosulphonyl, aryloxysulphonyl, hydroxyl, alkoxy, acyloxy, an aminosulphonyl which is optionally substituted by alkyl or aryl, or a fused-on cycloaliphatic or heterocyclic ring, is $C_1$–$C_6$-alkyl, aryl, halogen, nitro, hydroxyl, alkoxy, acyloxy, chlorosulphonyl, aryloxysulphonyl, an amino group which is optionally substituted by acyl or alkyl, an aminosulphonyl radical which is optionally substituted by alkyl or aryl, or a fused-on cycloaliphatic or heterocyclic ring, m is a number between 0 and 6, n is a number between 0 and 6, and, for m>1, X can in each case have different or the same above-mentioned meanings, and, for n>1, Y can in each case have different or the same above-mentioned meanings, have now been found.

In a preferred embodiment,

X denotes chlorine, bromine, —$NO_2$, —$OCH_3$, —$OCH_2(C_6H_5)$, chlorosulphonyl, —OH, —$SO_2O(C_6H_5)$, —$SO_2N(CH_3)_2$, —$SO_2NHCH_3$, methyl, ethyl, n-propyl, isopropyl, n-butyl, iso-butyl, sec-butyl, tert-butyl or a cycloaliphatic 5- or 6-membered ring which is preferably fused on in the 4,5-position, —$C_6H_5$ here and also below representing phenyl, Y denotes fluorine, chlorine, bromine, —$NO_2$, —OH, —$OCH_3$, —$NH_2$, chlorosulphonyl, —$NHCOCH_3$, —$N(C_2H_5)_2$, methyl, ethyl, n-propyl, isopropyl, n-butyl, isobutyl, sec-butyl, tert-butyl, an optionally substituted phenyl, a cycloaliphatic 5- or 6-membered ring which is preferably fused on in the 5,6- or 7,8-position, or a heterocyclic 5- or 6-membered ring which is preferably fused on in the 6,7-position and optionally contains one or two hetero atoms from the series comprising O, S and N, preferably oxygen, m denotes a number between 0 and 4 and n denotes a number between 0 and 5.

In an especially preferred embodiment, n and m denote 0.

The general formula (I) of the dyestuffs according to the invention is understood as meaning either the isomerically pure compound of the two possible embodiments (Ia) or (Ib)

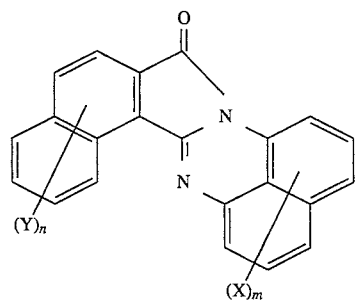

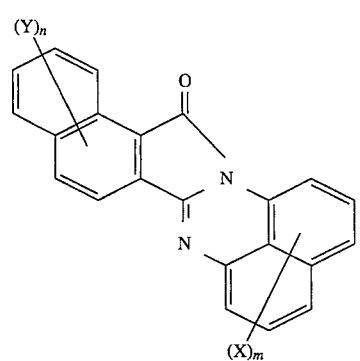

or mixtures of the two components (Ia) and (Ib) of any desired composition. The indices n and m here can have the character of a statistical value, and can therefore assume any desired number in the range defined.

The dyestuffs of the formula (I) according to the invention can be prepared by processes which are known per se (compare, for example, German Reichspatent 202,354, Chem. Ber. 75 (1942), 719; and Liebigs Ann. Chem. 365 (1909), 128) by condensation of naphthalene-1,2-dicarboxylic acids or anhydrides thereof, of the formula (II)

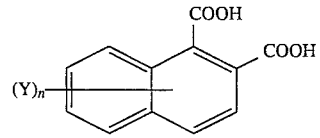

in which

Y and n have the meaning given, with naphthalene-1,8-diamines of the formula (III)

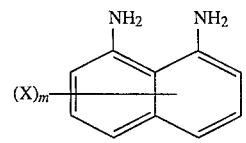

in which

X and m have the meaning given.

The condensation can be carried out here directly by melting together equimolar amounts of the components of the formulae (II) and (III) at temperatures between 50° C.

and 220° C., preferably at 120° to 180° C., or can be carried out more advantageously in a solvent at temperatures between 20° C. and 220° C. preferably 50° to 180° C., if appropriate under pressure, it being possible to remove the water of reaction by distillation.

Suitable solvents are, for example: chlorobenzene, o-dichlorobenzene, trichlorobenzene, xylene, dimethylformamide, N-methylpyrrolidone, glacial acetic acid, propionic acid, phenol, cresols, phenoxyethanol, glycols and mono- and dialkyl ethers thereof, alcohols, for example methanol, ethanol and i-propanol, water and aqueous solvents, such as, for example, dilute sulphuric acid and others.

If appropriate, the reaction can be carried out with addition of an acid catalyst.

Suitable catalysts are, for example: zinc chloride, p-toluenesulphonic acid, hydrochloric acid, sulphuric acid, organic acids and others.

The reaction usually takes place under normal pressure, if appropriate the reaction can be carried out under increased pressure, preferably between 1 and 40 bar.

The corresponding naphthalene-1,2-dicarboxylic acids (or functional derivatives thereof) can be prepared, for example, in accordance with Chem. Bet. 65 (1932), 1388; ibid. 73 (1940), 19.: Liebigs Ann. Chem. 595 (1955), 1; ibid. 684 (1965), 127.: J. Am. Soc. 57-(1935), 1851; ibid. 60 (1938), 951; ibid. 67 (1945), 345; ibid. 70 (1948), 748; ibid. 72 (1950), 1035; J. Org. Chem. 27 (1962), 5; ibid. 29 (1964), 2261; ibid. 32 (1967), 784; ibid. 36 (1971), 3755; J. Chem. Soc. (1951), 2488; ibid. (1961), 2701; Aust. J. Chem. 22 (1969) 1721; Przem. Chem. 51 (1972), 227 and others, and by processes analogous to these.

Chlorinated or brominated naphthalene-1,2-dicarboxylic acid derivatives can also be obtained by reaction of substituted or unsubstituted naphthalene-1,2-dicarboxylic acids with chlorine or bromine, if appropriate in the presence of Lewis acids, such as, for example, iron halides, aluminium halides or zinc halides, iron powder and others, in the melt or in an inert solvent, such as, for example, carbon tetrachloride, tetrachloroethane, nitrobenzene, o-dichlorobenzene, carbon disulphide and others.

The substituted naphthalene-1,8-diamines employed can be prepared, for example, in accordance with German Reichspatent 122 475; German Reichspatent 108 166; J. Chem. Soc. (1932) 2310; ibid. (1936), 556, 1338; ibid. (1945), 454, 543; ibid. (1951) 221; J. prakt. Chem. 94 (1916), 45; Compt. red. 224 (1947), 1569; An. Soc. espan. 31 (1933), 861, 876; and J. Org. Chem. 24 (1959), 214 and others, or by processes analogous to these.

The dyestuffs of the formula (I) according to the invention can accordingly be prepared from unsubstituted and/or substituted educts, with exchange of substituents carried out subsequently, if appropriate. Exchange of substituents here is understood as meaning either exchange of hydrogen or other ligands by a substituent, for example by means of chlorination, bromination, sulphonation, chlorosulphonation or nitration, or modification of substituents, as described by way of example below.

Dyestuffs of the formula (I) in which X and/or Y represent an alkyl- or arylaminosulphonyl radical can also be prepared, as well as by the process mentioned first, from the corresponding dyestuffs of the formula (I), in which X and/or Y denote a chlorosulphonyl radical, with alkyl- or arylamines.

Dyestuffs according to the invention in which X and/or Y are an aryloxysulphonyl radical can also be obtained by reaction of the corresponding chlorosulphonyl dyestuffs with phenols or naphthols in the presence of a base, for example pyridine, triethylamine, alkali metal carbonates, hydroxides or oxides or alkaline earth metal carbonates, hydroxides or oxides.

Dyestuffs of the formula (I) in which X and/or Y represent alkyloxy or acyloxy can additionally be prepared by alkylation or acylation of the dyestuffs according to the invention in which X and/or Y denote a hydroxyl group.

Those dyestuffs of the formula (I) where X and/or Y are an optionally acylated or alkylated amino group can furthermore be obtained by reduction of the corresponding compounds in which X and/or Y represent a nitro group with customary reducing agents, for example iron, zinc, sodium sulphide, hydrogen and others, and if appropriate subsequent acylation or alkylation. The acylation step can also be carried out in the course of the reduction by addition of an acylating agent.

The dyestuffs according to the invention are outstandingly suitable for bulk dyeing of plastics.

Bulk dyeing is understood here as meaning, in particular, processes in which the dyestuff is incorporated into the molten composition of plastic, for example with the aid of an extruder, or in which the dyestuff is already added to starting components for the preparation of the plastic, for example monomers, before the polymerisation.

Particularly preferred plastics are thermoplastics, for example vinyl polymers, polyesters and polyamides.

Suitable vinyl polymers are polystyrene, styrene/acrylonitrile copolymers, styrene/butadiene copolymers, styrene/butadiene/acrylonitrile terpolymers, polymethacrylate and others.

Polyesters which are furthermore suitable are: polyethylene terephthalates, polycarbonates and cellulose esters.

Polystyrene, styrene copolymers, polycarbonates and polymethacrylate are preferred. Polystyrene is particularly preferred.

The high molecular weight compounds mentioned can be present individually or as mixtures, as plastic compositions or melts.

The dyestuffs according to the invention are used in finely divided form, it being possible, but not necessary, to co-use dispersing agents.

If the dyestuffs (I) are employed after the polymerisation, they are mixed or ground with the granules of plastic in the dry state, and this mixture is plasticised and homogenised, for example on mixing rolls or in screws.

However, the dyestuffs can also be added to the molten composition and this can be distributed homogeneously by stirring. The material predyed in this way is then further processed in the customary manner, for example by spinning to bristles, filaments and the like, or by extrusion or in the injection-moulding process, to give mouldings.

Since the dyestuffs of the formula (I) are resistant to polymerisation catalysts, in particular peroxides, it is also possible to add the dyestuffs to the monomeric starting materials for the plastics and then to polymerise these materials in the presence of polymerisation catalysts. For this, the dyestuffs are preferably dissolved in the monomeric components or mixed intimately with them.

The dyestuffs of the formula (I) are preferably employed for dyeing the polymers mentioned in amounts of 0.0001 to 1% by weight, in particular 0.01 to 0.5% by weight, based on the amount of polymer.

Corresponding useful opaque dyeings can be obtained by addition of pigments which are insoluble in the polymers, such as, for example, titanium dioxide.

Titanium dioxide can be used in an amount of 0.01 to 10% by weight, preferably 0.1 to 5% by weight, based on the amount of polymer.

Transparent or opaque, brilliant yellowish-tinged red to violet dyeings having a good heat resistance and good fastness to light and weathering are obtained by the process according to the invention.

Mixtures of different dyestuffs of the formula (I) and/or mixtures of dyestuffs of the formula (I) with other dyestuffs and/or inorganic or organic pigments can also be employed in the process according to the invention.

The invention is explained by, but not limited to, the following examples, in which the parts are stated in parts by weight, percentage data denote percentages by weight (% by weight) and Z is a radical for completion of a 1,2-naphthylene system.

EXAMPLE 1

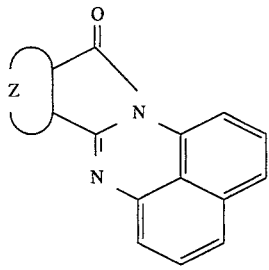

A) Preparation

A mixture of 2.0 parts of naphthalene-1,2-dicarboxylic anhydride, 1.6 parts of naphthalene-1,8-diamine and 20 parts of glacial acetic acid is heated at 75° C. for 5 minutes. After cooling, the resulting precipitate is filtered off with suction and washed with methanol and water. 3.0 parts (94%) of the above dyestuff are thus obtained. $\lambda_{max}$=499 nm (toluene).

$^1$H-NMR protonation experiments in deuterated dimethyl sulphoxide/trifluoroacetic acid show that the above dyestuff is present in the following isomeric form:

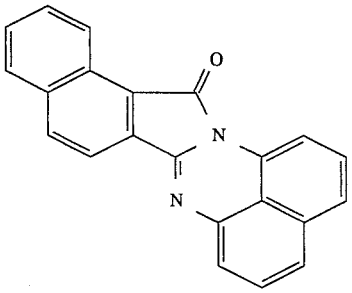

$^1$H-NMR (DMSO): δ7.5–8.0 (m, 7H), 8.2 (d, J=8 Hz, 1H), 8.25 (d, J=8 Hz, 1H), 8.45 (d, J=8 Hz, 2H), 9.05 ( d, J=8 Hz, 1H ) ppm.

$^1$H-NMR (DMSO/trifluoroacetic acid): δ7.4–7.9 (m, 7H), 8.0 (d, J=8 Hz, 1H), 8.25–8.35 (m, 2H), 8.4 (d, J=8 Hz, 1H), 8.85 (d, J=8 Hz, 1H) ppm.

B) Dyeing examples

Example a )

100 parts of polystyrene granules and 0.02 part of a dyestuff of the above formula are mixed intensively in a drum mixer for 15 minutes. The granules, dyed in the dry state, are processed on a screw injection-moulding machine at 240° C. Transparent red sheets of very good fastness to light are obtained. Instead of the polystyrene polymer, it is also possible to use copolymers with butadiene and acrylonitrile. If 0.5 part of titanium dioxide is additionally added, deep opaque dyeings are obtained.

Example b)

0.015 part of the dyestuff from Example A) and 100 parts of polymethyl methacrylate are mixed in the dry state and homogenised on a 1-screw extruder at 230° C. The material emerging from the extruder as a strand is granulated. The granules can then be pressed to shapes. A transparent red-coloured plastic having good fastness to light and weathering is obtained.

Example c)

100 parts of a commercially available polycarbonate are mixed in the dry state, in the form of granules, with 0.03 part of the dyestuff from Example A). The granules dusted in this way are homogenised on a 2-screw extruder at 290° C. A transparent red dyeing of good fastness to light is obtained. The dyed polycarbonate is discharged from the extruder as a strand and processed to granules. The granules can be processed by the customary methods of formulation of thermoplastic compositions.

If the procedure is carried out as described above, but with addition of 1% of titanium dioxide, a red opaque dyeing is obtained.

Example d)

0.04 part of the dyestuff from Example A) is mixed in the dry state with 100 parts of styrene/acrylonitrile copolymer, and the mixture is homogenised in a 2-screw extruder at 190° C., granulated and then pressed to shapes in the customary manner. A transparent red plastic of good fastness to light is obtained.

Example e)

0.025 part of the dyestuff from Example A) is mixed with 100 parts of polyethylene terephthalate of a transparent type, and the mixture is homogenised in a 2-screw extruder at 280° C. A transparent red dyeing of good fastness to light is obtained. After subsequent granulation, the coloured plastic can be processed by the customary methods of thermoplastic shaping. If the procedure is carried out with addition of 1% of titanium dioxide, an opaque dyeing is obtained.

Example f)

0.05 part of tert-dodecylmercaptan and 0.05 part of the dyestuff from Example A) are dissolved in 98.9 parts of styrene. This solution is dispersed in a solution of 200 parts of desalinated water, 0.3 part of partly hydrolysed polyvinyl acetate (for example Mowiol® 50/88 from Hoechst) and 0.05 part of dodecylbenzenesulphonate. After addition of 0.1 part of dibenzoyl peroxide in 1 part of styrene, the dispersion is heated to 80° C. with vigorous stirring, and the polymerisation is started. Use of the following polymerisation conditions: 4 hours at 80° C., 2 hours at 90° C., 3 hours at 110° C., 2 hours at 130° C. gives the polymer in a yield of 98% of theory. The polymer is obtained in the form of beads, which have a diameter of 0.1 to 1.5 mm ($D_{50}$ value), depending on the stirring conditions. The polymer is separated from the serum by filtration and dried to a residual moisture content of 0.5% at 110° C. After melting in a mixing unit (hot roll), 0.5% of zinc stearate and 0.2% of Ionol are mixed in, and the polymer is granulated.

The polymer can be processed to red transparent mouldings by the customary methods of thermoplastic shaping, for example in the injection-moulding process.

Example g)

0.2 part of tert-dodecylmercaptan and 0.01 part of the dyestuff from Example A) are dissolved in 74.8 parts of styrene and 25 parts of acrylonitrile, and the solution is then dispersed in a solution of 200 parts of completely desalinated water and 0.2 part of a copolymer, neutralised with sodium hydroxide, of styrene and maleic anhydride. After addition of 0.1 part of dibenzoyl peroxide, dissolved in one part of styrene, the dispersion is heated to 80° C. while stirring vigorously, and the polymerisation is started. After the polymerisation as in Example f), the mixture is worked up, also in the same manner as described in the example. 0.5% of zinc stearate, as a lubricant, and 0.5% of Ionol, as an anti-ageing agent, are incorporated in on a hot roll. The granulated polymer can be injection-moulded to form transparent red mouldings.

Example h)

A solution of 99.95 parts of styrene, 0.04 part of the dyestuff from Example A) and 0.01 part of di-tert-butyl peroxide is introduced into a preliminary reactor operating continuously with an overflow, and is partly polymerised at a temperature of 75° C. The partly polymerised solution (polystyrene content 20%) emerging from the preliminary reactor is introduced into a 2-screw unit. The two screws run in opposite directions at 20 revolutions per minute. The four heatable and coolable segments of the screw machine are kept at 110° C., 130° C., 160° C. and 180° C. in the sequence product entry-product discharge. The polymer leaves the screw reactor with a solids concentration of 80%. 3 parts by weight of Ionol and 5 parts by weight of octyl alcohol per 1000 parts by weight of polymer solution are metered into a subsequent extruder, and the polymer is degassed and then granulated. The red-coloured granules can be processed to mouldings.

Example i)

0.02 part of the dyestuff from Example A) are dissolved in 74.97 parts of styrene and 25 parts of acrylonitrile or methacrylonitrile. After addition of 0.01 part of di-tert-butyl peroxide, the solution thus obtained is introduced into a preliminary reactor operating continuously with an overflow. The polymerisation and working up are as described in Example h). The transparent red granules can be further processed to profiles and sheets by the customary methods of processing of thermoplastic compositions.

Example k)

0.03 part of the dyestuff from Example A) is dissolved in 99.97 parts of methyl methacrylate. After addition of 0.1 part of dibenzoyl peroxide, the solution is heated to 120° C. and the polymerisation is started. After 30 minutes, the partly polymerised methyl methacrylate is polymerised to completion between two glass sheets at 80° C. for 10 hours. Red, transparent sheets of polymethyl methacrylate are obtained.

Example l)

100 parts of polyamide 6 chips obtained by polymerisation of ε-caprolactam are intimately mixed with 0.05 part of the dyestuff from Example A) in a shaking machine. The powdered chips thus obtained are melted in an extruder at 260° C., the resulting melt is pressed through a single-hole dye of 0.5 mm diameter, and the emerging filament is taken off at a rate of about 25 m/minute. The filament can be stretched four-fold in hot water. A transparently red-coloured filament of excellent fastness to light is obtained. If an opaque dyeing is to be obtained, 0.5 part of titanium dioxide is additionally added.

The residence time in the extruder can be up to 30 minutes, without impairment of the colour shade.

EXAMPLES 2 to 60

The dyestuffs described in Table 1 are obtained in a manner analogous to that described in Example 1A from the compounds of the formulae (II) and (III), and are used for dyeing in plastics in accordance with Example 1B a)–l) to produce the colour shades shown in Table 1.

TABLE 1

| Example | Substituted naphthalene-1,2-dicarboxylic anhydride (III) employed | Substituted 1,8-diaminonaphthalene (III) employed | Yield of dyestuff (I) analogously to Example 1A | Colour shade analogously to Example 1B |
|---|---|---|---|---|
| 2 | 4-Methyl | unsubstituted | 92% | red |
| 3 | 5-Methyl | " | 92% | red |
| 4 | 7-Methyl | " | 90% | red |
| 5 | 3,7-Dimethyl | " | 89% | red |
| 6 | 4,7-Dimethyl | " | 90% | red |
| 7 | 5,6-Dimethyl | " | 90% | red |
| 8 | 5,7-Dimethyl | " | 88% | red |
| 9 | 5,8-Dimethyl | " | 91% | red |
| 10 | 6,7-Dimethyl | " | 85% | red |
| 11 | 3-Ethyl | " | 86% | red |
| 12 | 7-Ethyl | " | 89% | red |
| 13 | 3,5-Diethyl | " | 83% | red |
| 14 | 7-t-Butyl | " | 85% | red |
| 15 | 5,6-Tetramethylen | " | 85% | red |
| 16 | 7,8-Tetramethylen | " | 89% | red |
| 17 | 3-Phenyl | " | 95% | bluish-tinged red |
| 18 | 4-Phenyl | " | 93% | bluish-tinged red |
| 19 | 4-(4-Methylphenyl) | " | 91% | bluish-tinged red |
| 20 | 4-(4-Chlorphenyl) | " | 96% | bluish-tinged red |

TABLE 1-continued

| Example | Substituted naphthalene-1,2-dicarboxylic anhydride (III) employed | Substituted 1,8-diamino-naphthalene (III) employed | Yield of dye-stuff (I) analogously to Example 1A | Colour shade analogously to Example 1B |
|---|---|---|---|---|
| 21 | 7-Phenyl | " | 94% | bluish-tinged red |
| 22 | 4,7-Diphenyl | " | 98% | bluish-tinged red |
| 23 | 7-Hydroxy | " | 90% | red |
| 24 | 7-Methoxy | " | 91% | yellowish-tinged red |
| 25 | 6,7-Dimethoxy | " | 91% | yellowish-tinged red |
| 26 | 6,7,8-Trimethoxy | " | 87% | yellowish-tinged red |
| 27 | 7-Methyl-3-phenyl | " | 90% | bluish-tinged red |
| 28 | 5,8-Dimethyl-3-phenyl | " | 92% | bluish-tinged red |
| 29 | 7-Methoxy-3-methyl | " | 89% | yellowish-tinged red |
| 30 | 7-Hydroxy-6-methoxy-3-methyl | " | 85% | yellowish-tinged red |
| 31 | 6,7-Dimethoxy-3-methyl | " | 86% | yellowish-tinged red |
| 32 | 3-Methyl-6,7-methylendioxy | " | 86% | yellowish-tinged red |
| 33 | 3-Methyl-6,7,8-trimethoxy | " | 88% | yellowish-tinged red |
| 34 | 7-Methoxy-4-phenyl | " | 92% | red |
| 35 | 7-Methoxy-4-(4-methoxy-phenyl) | " | 93% | yellowish-tinged red |
| 36 | 6,7-Dimethoxy-4-phenyl | " | 90% | yellowish-tinged red |
| 37 | 7-Amino | unsubstituted | 87% | yellowish-tinged red |
| 38 | 7-Acetylamino | " | 95% | red |
| 39 | 7-Phthalimido | " | 98% | red |
| 40 | 7-Diethylamino | " | 86% | yellowish-tinged red |
| 41 | 7-Nitro | " | 93% | bluish-tinged red |
| 41 | 8-Nitro | " | 96% | bluish-tinged red |
| 43 | 7-Fluor | " | 88% | bluish-tinged red |
| 44 | 7-Chlor | " | 93% | bluish-tinged red |
| 45 | 7-Brom | " | 98% | bluish-tinged red |
| 46 | 7-Chlor-4-(4-chlor-phenyl) | " | 97% | bluish-tinged red |
| 47 | 7-Brom-4-phenyl | " | 97% | bluish-tinged red |
| 48 | unsubstituted | 2-Methyl | 91% | red |
| 49 | " | 4-Methyl | 90% | red |
| 50 | " | 4,5-Dimethylen | 93% | red |
| 51 | " | 3,6-Dinitro | 92% | yellowish-tinged red |
| 52 | " | 4,5-Dihydroxy | 88% | red |
| 53 | " | 4,5-Dibenzyloxy | 96% | red |
| 54 | " | 2,7-Dihydroxy | 94% | red |
| 55 | " | 2,7-Dimethoxy | 87% | red |
| 56 | " | 2-Chlor | 83% | yellowish-tinged red |
| 57 | " | 4-Chlor | 84% | yellowish-tinged red |
| 58 | " | 4-Brom | 91% | yellowish-tinged red |
| 59 | " | 2,4-Dibrom | 98% | yellowish-tinged red |
| 60 | " | 2,4,7-Tribrom | 98% | yellowish-tinged red |

EXAMPLE 61

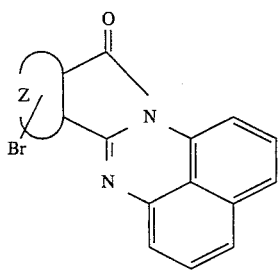

a) Bromonaphthalene-1,2-dicarboxylic anhydride: 4.0 g of naphthalene-1,2-dicarboxylic anhydride, 0.05 g of ferrum reductum, 20 ml of carbon tetrachloride and 5.0 ml of bromine are stirred at room temperature for 3 days. The solvent is then removed completely in vacuo, the residue is dissolved in a solution of 2.5 g of sodium hydroxide and 1.0 g of sodium sulphite in 150 ml of water, the iron hydroxide is filtered off and the product is precipitated with concentrated hydrochloric acid at 0°–5° C. (yield: 5.7 g). The resulting acid is heated under reflux in 25 ml of acetic anhydride for 1 hour. After cooling, the product is filtered off with suction and dried in vacuo over KOH; yield: 4.5 g (81%), bromine content: 28.75% (theoretical 28.9%).

b) If the anhydride thus obtained ( 2.8 parts ) is reacted analogously to Example 1A, 3.8 parts ( 95% ) of the above dyestuff are obtained. $\lambda_{max}$=500 nm (N-methylpyrrolidone)

Dyeing is carried out analogously to Example 1B, and bluish-tinged red dyeings of excellent fastness to light are obtained.

EXAMPLE 62

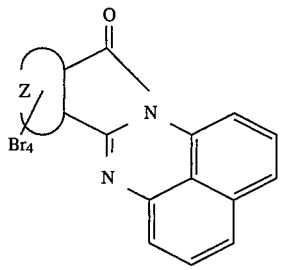

a) Tetrabromonaphthalene-1,2-dicarboxylic anhydride: 2.0 g of naphthalene-1,2-dicarboxylic anhydride, 0.05 g of ferrum reductum and 5.2 ml of bromine are heated at 210° C. for 6 hours using a long intensive condenser. Working up analogously to Example 61a) gives 5.0 g of tetrabromonaphthalene-1,2-dicarboxylic acid, which is converted into the anhydride with acetic anhydride. Yield: 4.8 g (94%), bromine content: 62.4% (theoretical 62.7%).

b) If the tetrabromo compound thus obtained (5.2 parts) is reacted analogously to Example 1A, 6.3 parts (99%) of the abovementioned dyestuff tetrabromo-1,2-naphthaloperinone are obtained. If this is used for dyeing analogously to Example 1B, violet dyeings having a very good fastness to light result. $\lambda_{max}$=523 nm (N-methylpyrrolidone).

EXAMPLE 63

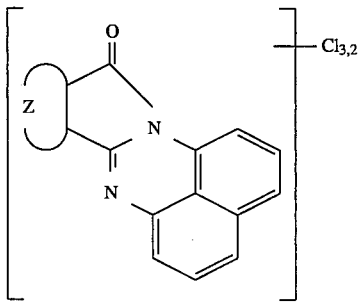

A mixture of 2.1 parts of the dyestuff from Example 1, 2.8 parts of sulphuryl chloride and 50 parts of N-methylpyrrolidone is stirred at room temperature for 20 hours. The mixture is topped up with in each case 2.8 parts of sulphuryl chloride after 3.5 hours and after 6 hours. The precipitate is then filtered off with suction, washed with N-methylpyrrolidone and methanol and dried in vacuo. Yield: 1.7 parts of a dyestuff having a chlorine content of 26.2%. The dyestuff gives yellowish-tinged red shades in plastics dyed in accordance with Example 11B a)-1). $\lambda_{max}$=483 nm (N-methylpyrrolidone).

EXAMPLE 64

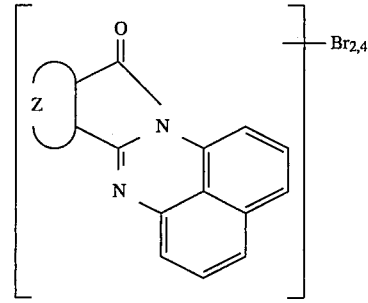

2.1 parts of the compound from Example 1, 50 parts of dimethylformamide and 6.9 parts of bromine are stirred for 20 hours. The precipitate is filtered off with suction and washed with dimethylformamide and methanol. 3.1 parts of the dyestuff having a bromine content of 37.0%, which, when used for dyeing analogously to Example 1B a)-1), produces red colour shades, are obtained. $\lambda_{max}$=494 nm (N-methylpyrrolidone).

EXAMPLE 65

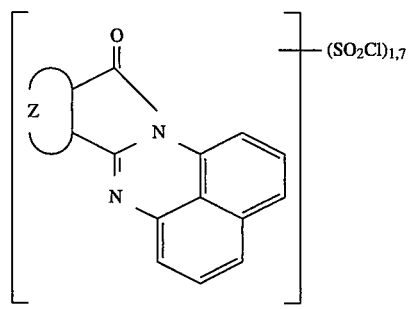

4.5 parts of the dyestuff from Example 1 are introduced into 35 parts of chlorosulphonic acid at room temperature. 3 parts of thionyl chloride are then added and the mixture is subsequently stirred at 25°–30° C. for 3 hours. The solution is discharged onto 200 parts of ice, and the resulting precipitate is filtered off with suction, washed thoroughly with water and dried in vacuo over KOH. $\lambda_{max}$=467 nm (N-methylpyrrolidone).

EXAMPLE 66

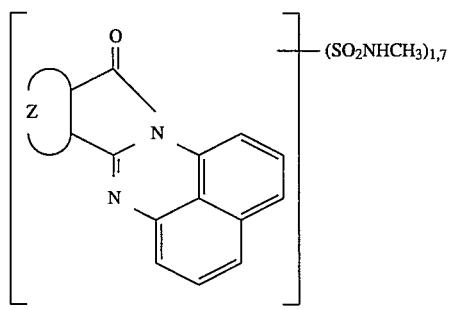

3.0 parts of the compound from Example 65 are introduced into 25 parts of 30% strength aqueous methylamine solution at 15° C., and the mixture is subsequently stirred at room temperature for 1 hour. 12.5 parts of glacial acetic acid are then added and the solution is heated at the boiling point for 10 minutes. After cooling, the corresponding precipitate is filtered off with suction and washed with water. 2.9 parts of a dyestuff of the above formula having a sulphur content of 11.4%, which dyes plastics (in accordance with Examples 1B a)-1)) a yellowish-tinged red, are obtained. $\lambda_{max}$=479 nm (N-methylpyrrolidone).

EXAMPLE 67

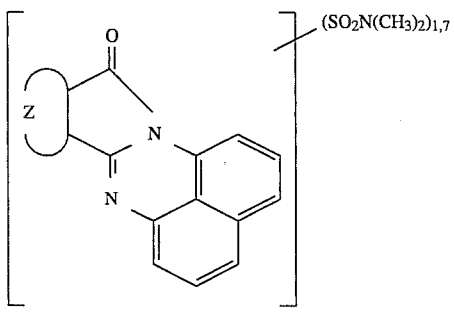

The dyestuff of the abovementioned formula having a sulphur content of 11.0% is obtained in a manner analogous to Example 66 if, instead of the methylamine solution, 25 parts of a 30% strength aqueous dimethylamine solution are employed. Yield: 3.1 parts.

This dyestuff dyes plastics in yellowish-tinged red shades in accordance with Example 1B a)-1).

EXAMPLE 68

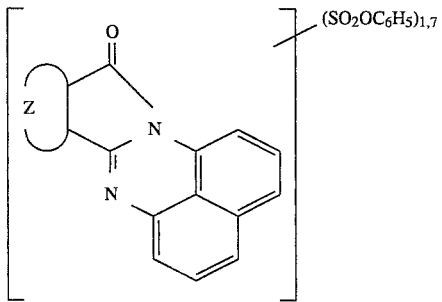

A mixture of 3.0 parts of the compound from Example 65, 3.4 parts of phenol, 6.0 parts of anhydrous potassium carbonate, 30 parts of acetone and 30 parts of N-methylpyrolidone is stirred at room temperature for 20 hours. 100 parts of methanol are then added, and the precipitate is filtered off with suction and washed with methanol and water. Yield: 1.9 parts of a dyestuff of the above formula having a sulphur content of 9.3%. When used for dyeing analogously to Example 1B a)-1), this dyestuff exhibits yellowish-tinged red colour shades. $\lambda_{max}$=473 nm (N-methylpyrrolidone).

What is claimed is:

1. A dyestuff produced by the reaction of a naphthalene-1,2-dicarboxylic acid of the formula (II)

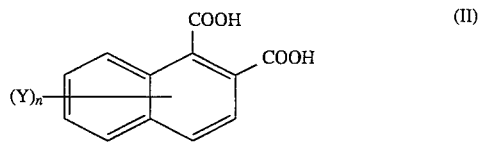

or anhydride thereof, wherein

Y represents $C_1-C_6$-alkyl, phenyl or a tetramethylene group which is fused on the 5,6- or 7,8-position, n is a number between 0 and 5 and for n>1, Y can in each case have different or the same abovementioned meanings, with a napthalene-1,8-diamine of the formula (III)

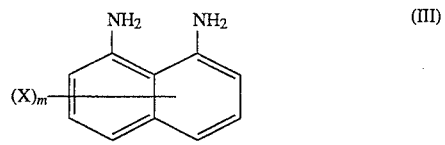

in which

X represents $C_1-C_6$-alkyl or a dimethylene group which is fused on the 4,5-position, m is a number between 0 and 4, and, for m>1, X can in each case have different or the same abovementioned meanings, in the melt or in a solvent at a temperature between 20° and 220° C.

2. A dyestuff produced by the process according to claim 1, wherein

X represents methyl, ethyl, n-propyl, isopropyl, n-butyl, iso-butyl, sec.-butyl, tert.-butyl or a dimethylene group which is fused on the 4,5-position, Y represents methyl, ethyl, n-propyl, isopropyl, n-butyl, iso-butyl, or a tetramethylene group which is fused on the 5,6- or 7,8-position, m is a number between 0 and 4 and n is a number between 0 and 5.

3. A dyestuff produced by the process according to claim 1, wherein m and n are 0.

* * * * *